(12) United States Patent
Choi et al.

(10) Patent No.: US 10,384,717 B2
(45) Date of Patent: Aug. 20, 2019

(54) VEHICLE AND METHOD FOR CONTROLLING THE SAME

(71) Applicants: Hyundai Motor Company, Seoul (KR); Kia Motors Corporation, Seoul (KR); Industry-University Cooperation Foundation Hanyang University (IUCF-HYU), Seoul (KR)

(72) Inventors: Jaewoong Choi, Seoul (KR); DongChan Kim, Seoul (KR); JangHee Park, Seoul (KR); Kunsoo Huh, Seoul (KR); JongHyeok Park, Seoul (KR)

(73) Assignees: Hyundai Motor Company, Seoul (KR); Kia Motors Corporation, Seoul (KR); Industry-University Cooperation Foundation Hanyang University (IUCF-HYU), Seoul (KR)

( * ) Notice: Subject to any disclaimer, the term of this patent is extended or adjusted under 35 U.S.C. 154(b) by 92 days.

(21) Appl. No.: 15/645,750

(22) Filed: Jul. 10, 2017

(65) Prior Publication Data

US 2018/0281857 A1 Oct. 4, 2018

(30) Foreign Application Priority Data

Apr. 3, 2017 (KR) .......................... 10-2017-0042955

(51) Int. Cl.
*B62D 15/02* (2006.01)
*B60W 10/18* (2012.01)
(Continued)

(52) U.S. Cl.
CPC ......... *B62D 15/0265* (2013.01); *B60W 10/18* (2013.01); *B60W 10/20* (2013.01);
(Continued)

(58) Field of Classification Search
CPC ...... B62D 15/0265; B62D 6/003; B62D 6/02; G08G 1/166; B60W 30/09; B60W 30/095;
(Continued)

(56) References Cited

U.S. PATENT DOCUMENTS 9,126,573 B2 9/2015 Yuasa et al.
2006/0197377 A1* 9/2006 Takahashi ............. B60T 8/1755
303/146

(Continued)

FOREIGN PATENT DOCUMENTS

JP 2012-040946 A 3/2012
KR 10-2016-0023193 A 3/2016
KR 10-1665451 B1 10/2016

*Primary Examiner* — Yuen Wong
(74) *Attorney, Agent, or Firm* — Morgan, Lewis & Bockius LLP

(57) ABSTRACT

A vehicle and method for controlling the same may include a speed detector configured to detect driving speed of the vehicle, a detection sensor configured to detect a target vehicle around the vehicle and obtain information about at least one of position and speed of the target vehicle, and a controller configured to determine a steering-based avoidance path for the vehicle to avoid the target vehicle by being steered, determine a maximum lateral acceleration of the vehicle for the vehicle to avoid the target vehicle in the steering-based avoidance path, and send a control signal for steering-based avoidance of the vehicle to avoid a collision with the target vehicle based on the determined maximum lateral acceleration.

18 Claims, 13 Drawing Sheets

(51) Int. Cl.

| | |
|---|---|
| *B60W 10/20* | (2006.01) |
| *B60W 30/09* | (2012.01) |
| *B60W 30/095* | (2012.01) |
| *B62D 6/00* | (2006.01) |
| *B62D 6/02* | (2006.01) |
| *G08G 1/16* | (2006.01) |

(52) U.S. Cl.
CPC .......... *B60W 30/09* (2013.01); *B60W 30/095* (2013.01); *B62D 6/003* (2013.01); *B62D 6/02* (2013.01); *G08G 1/166* (2013.01); *B60W 2550/30* (2013.01); *B60W 2710/18* (2013.01); *B60W 2710/20* (2013.01); *B60W 2720/125* (2013.01); *B60W 2720/14* (2013.01); *B60W 2720/20* (2013.01)

(58) Field of Classification Search
CPC .. B60W 10/18; B60W 10/20; B60W 2720/14; B60W 2720/20; B60W 2710/18; B60W 2720/125; B60W 2550/30; B60W 2710/20
See application file for complete search history.

(56) References Cited

U.S. PATENT DOCUMENTS

| | | | | |
|---|---|---|---|---|
| 2013/0173132 A1* | 7/2013 | Yuasa | ....................... | B60T 7/22 |
| | | | | 701/70 |
| 2013/0218396 A1* | 8/2013 | Moshchuk | ............ | B60W 50/08 |
| | | | | 701/25 |

* cited by examiner

VEHICLE AND METHOD FOR CONTROLLING THE SAME

CROSS-REFERENCE(S) TO RELATED APPLICATIONS

The present application claims priority to Korean Patent Application No. 10-2017-0042955, filed on Apr. 3, 2017, the entire contents of which is incorporated herein for all purposes by this reference.

BACKGROUND OF THE INVENTION

Field of the Invention

The present invention relates to a vehicle and method for controlling the same, and more particularly, to a technology to timely control steering-based avoidance of a vehicle to avoid a collision between the vehicle and a target vehicle.

Description of Related Art

Vehicles transport people or goods to destinations while being driven along the roads or tracks. The vehicle able to move to various locations with one or more wheels disposed onto the frame of the vehicle. Such vehicles may be classified into three- or four-wheel vehicles, a two-wheel vehicle such as a motorcycle, construction machinery, bicycles, trains traveling along rails on the tracks, and the like.

In modern society, vehicles are the most common transportation means, and the number of people using the vehicles are ever increasing. With the development of automobile technology, there are advantages of moving a long distance without much effort, making lives more convenient, etc., but also problems often arise in that traffic conditions get worse and traffic jams get serious where population densities are high.

To relieve burdens and increase convenience of the driver, recent studies on vehicles provided with an Advanced Driver Assist System (ADAS) that actively provides information about a state of the vehicle, a state of the driver, and surrounding conditions are actively ongoing.

As examples of the ADAS provided in the vehicle, there are an Autonomous Emergency Brake (AEB) and an Autonomous Emergency Steering (AES). The above systems are collision avoidance systems that determine the risk of a vehicle on the move colliding with other vehicles around it, and apply an emergency brake in the situation of a collision or avoid collisions with the other vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a timely perform steering-based collision avoidance control by estimating lateral acceleration to be generated when a vehicle is steered to avoid a collision with another vehicle.

In accordance with an aspect of the present invention, a vehicle may include a speed detector configured to detect the driving speed of the vehicle; a detection sensor configured to detect a target vehicle around the vehicle and obtain information about at least one of position and speed of the target vehicle; and a controller configured to determine a steering-based avoidance path for the vehicle to avoid the target vehicle by being steered, determine a maximum lateral acceleration of the vehicle for the vehicle to avoid the target vehicle in the steering-based avoidance path, and send a control signal for steering-based avoidance of the vehicle to avoid a collision with the target vehicle based on the determined maximum lateral acceleration.

The controller may be configured to expect a driving path of the target vehicle based on the information about at least one of the detected position and speed of the target vehicle, and determine the steering-based avoidance path based on the expected driving path of the target vehicle.

The controller may be configured to determine the steering-based avoidance path based on information about lanes on a road on which the vehicle is being driven.

The controller may be configured to determine a slip angle and a yaw rate of the vehicle to avoid the target vehicle in the steering-based avoidance path.

The controller may be configured to determine the maximum lateral acceleration of the vehicle based on the determined slip angle and yaw rate of the vehicle.

The controller may be configured to compare the determined maximum lateral acceleration of the vehicle with predetermined first and second lateral acceleration thresholds, and send the control signal for steering-based avoidance of the vehicle when the maximum lateral acceleration of the vehicle exceeds the first lateral acceleration threshold and is less than the second lateral acceleration threshold.

The controller may be configured to not send the control signal for steering-based avoidance of the vehicle, when the maximum lateral acceleration of the vehicle is equal to or less than the first lateral acceleration threshold or equal to or greater than the second lateral acceleration threshold.

The controller may be configured to send a control signal to reduce the driving speed of the vehicle, when the maximum lateral acceleration of the vehicle is equal to or greater than the second lateral acceleration threshold.

The first lateral acceleration threshold may include a highest value of lateral acceleration to be generated while the vehicle is driven, and the second lateral acceleration threshold may include a highest value of lateral acceleration to be generated by steering while the vehicle is driven.

The vehicle may further include: a speed controller configured to control the driving speed of the vehicle.

The detection sensor may include one of a radar and a Light Detection And Ranging (LiDAR).

In accordance with another aspect of the present invention, a method for controlling a vehicle may include detecting a target vehicle around the vehicle and obtaining information about at least one of position and speed of the target vehicle; expecting a driving path of the target vehicle based on the information about at least one of the position and speed of the target vehicle; determining a steering-based avoidance path for the vehicle to avoid the target vehicle by being steered based on the expected driving path of the target vehicle; determining a maximum lateral acceleration of the vehicle to avoid the target vehicle in the steering-based avoidance path; and sending a control signal for steering-based avoidance of the vehicle to avoid a collision with the target vehicle based on the determined maximum lateral acceleration.

The determining a steering-based avoidance path may include: determining the steering-based avoidance path based on information about lanes on a road on which the vehicle is being driven.

The method for controlling a vehicle may further include: determining a slip angle and a yaw rate of the vehicle to avoid the target vehicle in the steering-based avoidance path.

The method for controlling a vehicle may further include: determining the maximum lateral acceleration of the vehicle based on the determined slip angle and yaw rate of the vehicle.

The method for controlling a vehicle may further include: comparing the determined maximum lateral acceleration of the vehicle with predetermined first and second lateral acceleration thresholds, and sending the control signal for steering-based avoidance of the vehicle when the maximum lateral acceleration of the vehicle exceeds the first lateral acceleration threshold and is less than the second lateral acceleration threshold.

The method for controlling a vehicle may further include: not sending the control signal for steering-based avoidance of the vehicle when the maximum lateral acceleration of the vehicle is equal to or less than the first lateral acceleration threshold or equal to or greater than the second lateral acceleration threshold.

The method for controlling a vehicle may further include: sending a control signal to reduce the driving speed of the vehicle when the maximum lateral acceleration of the vehicle is equal to or greater than the second lateral acceleration threshold.

The first lateral acceleration threshold may include a highest value of lateral acceleration to be generated while the vehicle is driven, and the second lateral acceleration threshold may include a highest value of lateral acceleration to be generated by steering while the vehicle is driven.

The method for controlling a vehicle may further include: controlling the driving speed of the vehicle based on the control signal.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
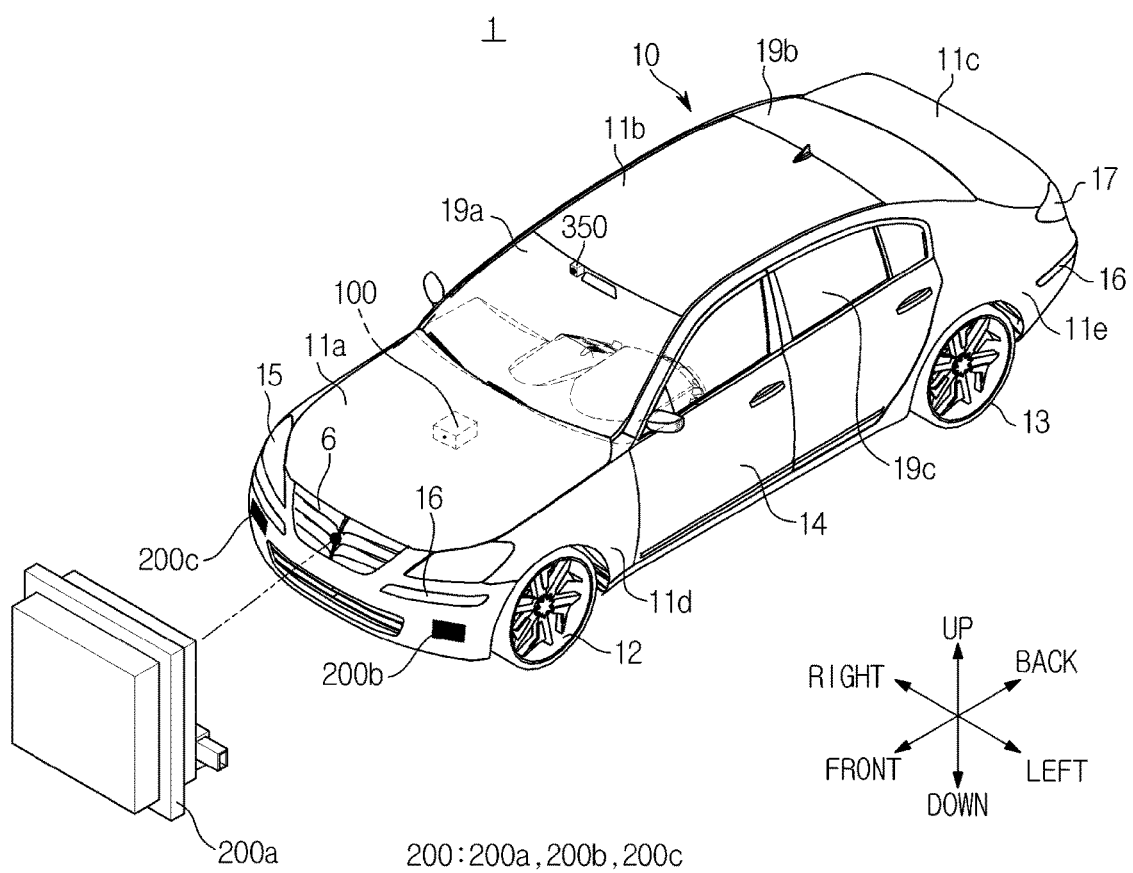
FIG. 1 is a perspective view schematically illustrating the external of a vehicle, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalents parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments but also various alternatives, modifications, equivalents and other embodiments, which may be included within the spirit and scope of the invention as defined by the appended claims.

Not all elements of embodiments of the present invention will be described, and a description of what are commonly known in the art or what overlap each other in the exemplary embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or portions may not be limited by these terms. These terms are only used to distinguish one element, component, region, layer or portion from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present invention will now be described with reference to accompanying drawings.

Figure 2:
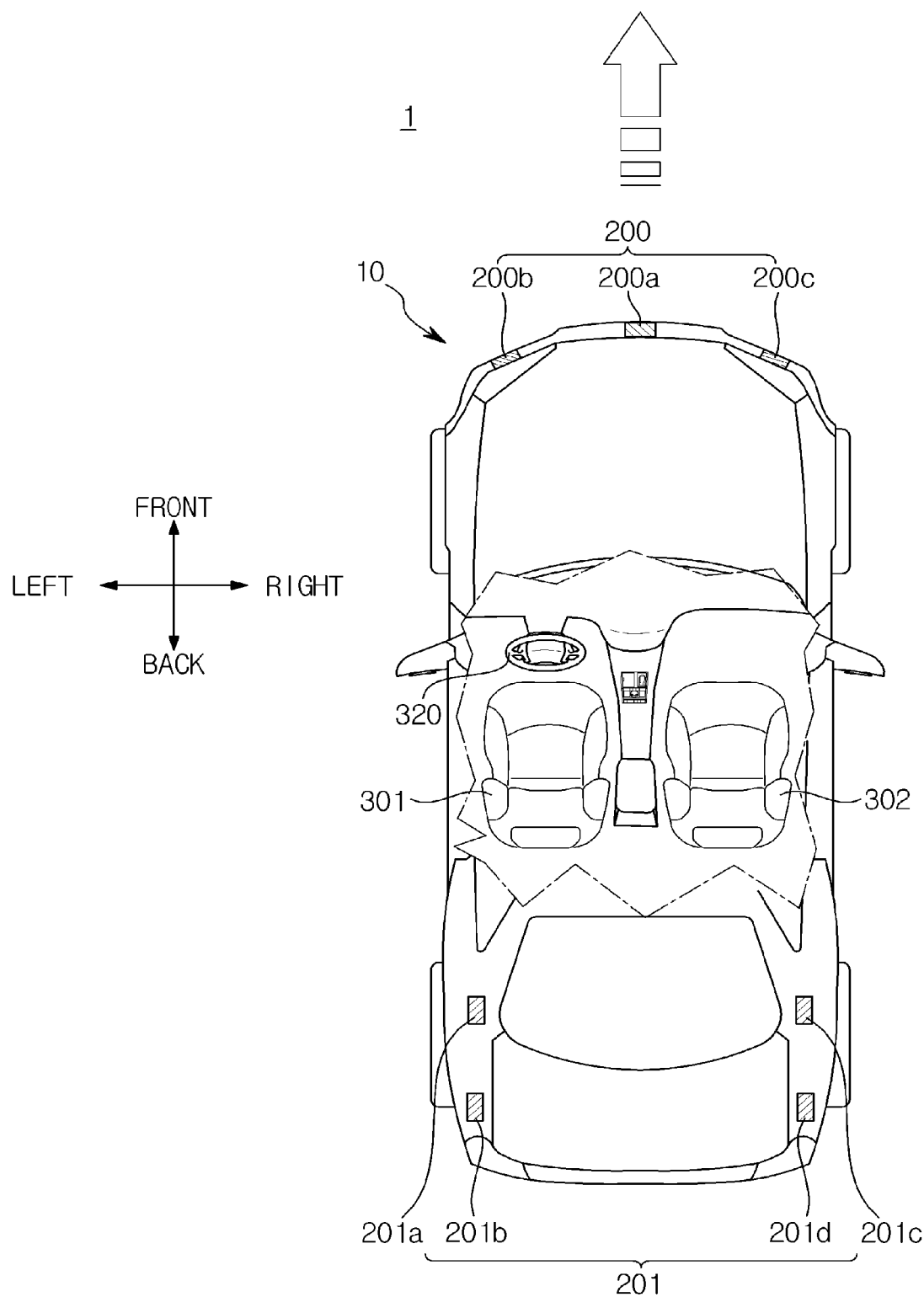
FIG. 2 shows a vehicle provided with detection sensors and detectors for detecting vehicles behind and to the sides, according to an exemplary embodiment of the present invention.
Figure 3:
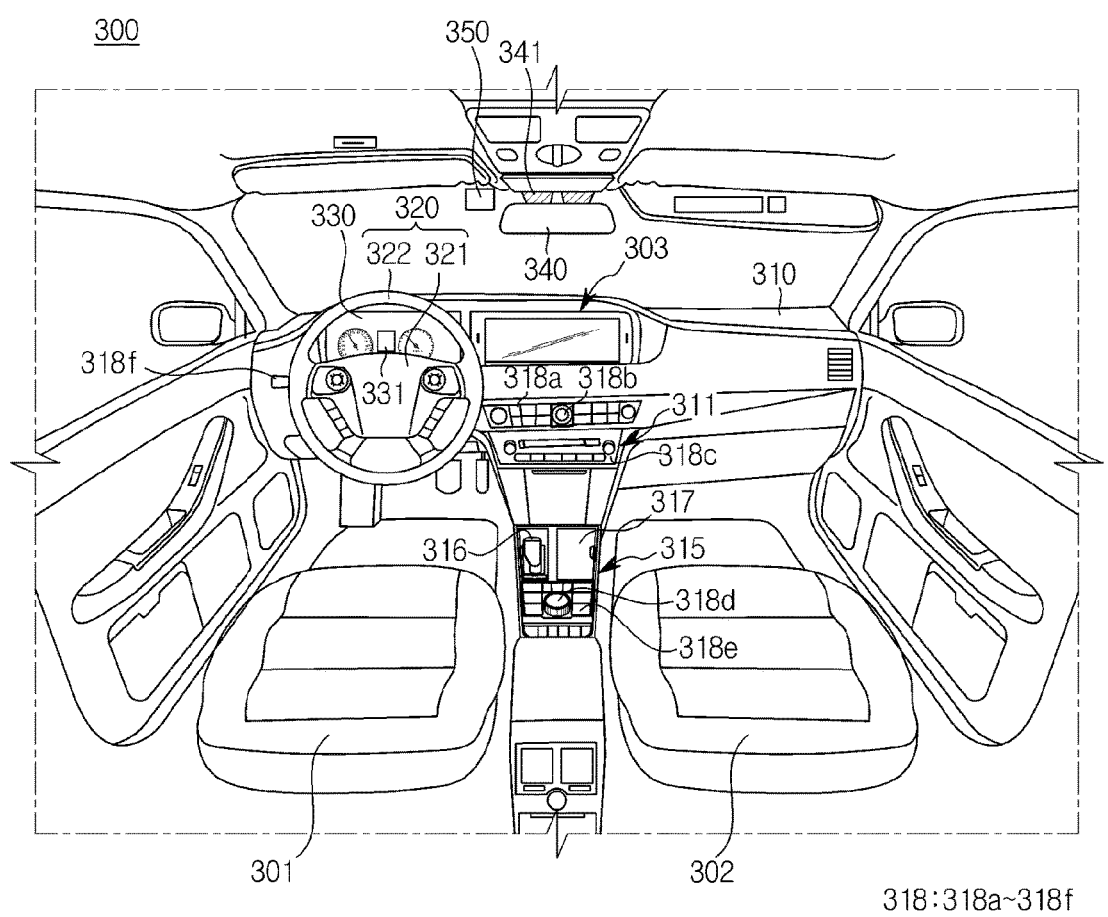
FIG. 3 shows internal features of a vehicle, according to an exemplary embodiment of the present invention.
Figure 4:
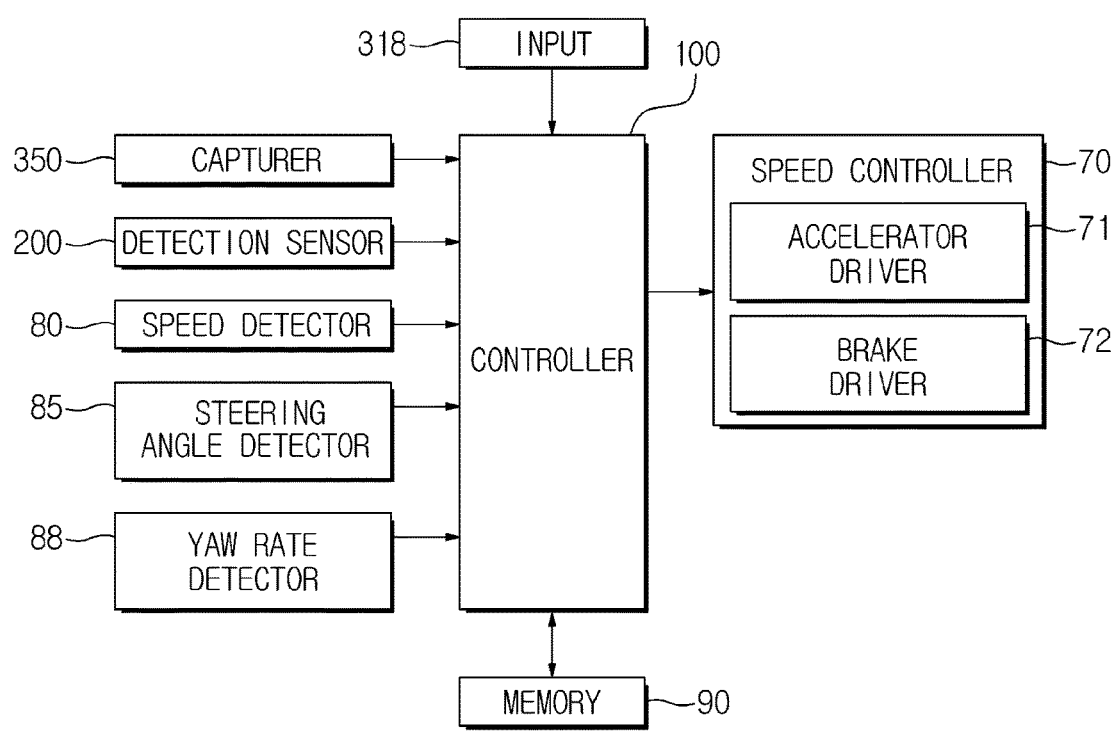
FIG. 4 is a control block diagram of a vehicle, according to an exemplary embodiment of the present invention.

FIG. 1 is a perspective view schematically illustrating the external of a vehicle, according to an exemplary embodiment of the present invention. FIG. 2 shows a vehicle provided with detection sensors and detectors for detecting vehicles behind and to the sides, according to an exemplary embodiment of the present invention, FIG. 3 shows internal features of a vehicle, according to an exemplary embodiment of the present invention, and FIG. 4 is a control block diagram of a vehicle, according to an exemplary embodiment of the present invention.

For convenience of explanation, as shown in FIG. 1, a direction in which a vehicle 1 advances is called a forward direction, and left and right directions are distinguished based on the forward direction. When the forward direction corresponds to the 0° position, the right direction is defined to correspond to the 90° position or around the 90° position, and the left direction is defined to correspond to the −90° position or around the −90° position. The opposite direction of the forward direction is the rear direction. Also, a direction down to the floor of the vehicle 1 is called a downward direction, and a direction opposite to the downward direction is called an upward direction. Furthermore, a side located ahead is called a front side, a side located behind is called a rear side, and sides located on either side are called sides. The sides include left and right sides.

Referring to FIG. 1, a vehicle 1 may include a vehicle body 10 that forms the external, and wheels 12 and 13 for moving the vehicle 1.

The vehicle body 10 may include a hood 11a for protecting various devices required for driving the vehicle 1, a roof panel 11b that forms an internal compartment, a trunk lid 11c of a trunk, front fenders 11d disposed on the sides of the vehicle 1, and quarter panels 11e. There may be a plurality of doors 15 disposed on the sides of the vehicle body 10 and hinged with the vehicle body 10.

A front window 19a is disposed between the hood 11a and the roof panel 11b for providing a view ahead of the vehicle 1, and a rear window 19b is disposed between the roof panel 11b and the trunk lid 11c for providing a view behind the vehicle 1. Side windows 19c may also be built into the upper portion of the doors 15 to provide side views.

Headlamps 15 may be disposed on the front of the vehicle 1 for lighting a direction in which the vehicle 1 advances.

Turn signal lamps 16 may also be disposed on the front and back of the vehicle 1 for indicating a direction to which the vehicle 1 is going to make a turn.

The vehicle 1 may blink the turn signal lamp 16 to indicate a direction to turn to. Tail lamps 17 may also be disposed on the back of the vehicle 1. The tail lamps 17 may indicate a state of gear shift, a state of brake operation of the vehicle 1, etc.

As shown in FIG. 1 and FIG. 3, at least one capturer 350 may be disposed inside the vehicle 1. The capturer 350 may capture an image around the vehicle 1 while the vehicle is being driven or stopped, and further obtain information about a type and position of the object. The object captured around the vehicle 1 may include another vehicle, pedestrian, bicycle, etc., and further include a moving object or various fixed obstacles.

The capturer 350 may detect a type of the object around the vehicle 1 by capturing the object and identifying a shape of the captured object through image recognition, and send the detected information to the controller 100.

While the capturer 350 is disposed around a rear view mirror 340 in FIG. 3, where to arrange the capturer 350 is not limited thereto, but may be disposed at any place that allows the capturer 350 to obtain image information by capturing inside or outside of the vehicle 1.

The capturer 350 may include at least one camera, and further include a three dimensional (3D) space recognition detector, radar detector, ultrasound detector, etc., to capture a more accurate image.

For the 3D space recognition detector, a KINECT (RGB-D sensor), TOF (Structured Light Sensor), stereo camera, or the like may be used, without being limited thereto, and any other devices having the similar function may also be used.

The capturer 350 may identify a type of an object around the vehicle 1 by capturing an image of the object, further obtain information about coordinates of the captured object with respect to the vehicle 1, and send the coordinate information to the controller 100. As the object moves around the vehicle 1, the coordinates and moving speed of the object may vary in real time, and as the vehicle 1 moves as well, the position and speed thereof may vary in real time. The capturer 350 may detect the object by capturing an image of the object in real time when the object is moving around.

Referring to FIG. 1 and FIG. 2, the vehicle 1 may include a detection sensor 200 for detecting another vehicle or obstacle located in front of the vehicle 1 to obtain information about at least one of position and moving speed of the detected object.

In an embodiment, the detection sensor 200 may obtain information about coordinates of the object located around the vehicle 1 based on the vehicle 1. In other words, the detection sensor 200 may obtain the coordinate information in real time, which may vary as the object moves, and detect a distance between the vehicle 1 and the object.

For example, the detection sensor 200 may detect another vehicle, a pedestrian, and a bicycle object located in front of the vehicle 1, obtain information about the position of them, and obtain coordinate information of them varying as they move around.

The detection sensor 200 may detect a distance between the vehicle 1 and an object based on the information about the coordinates of the object, and obtain information about a speed at which the object moves around the vehicle 1.

As will be described below, the controller 100 may determine a relative distance and relative speed between the vehicle 1 and an object based on the information about position and speed of the object obtained by the detection sensor 200, and determine a time to collision (TTC) of the vehicle 1 against the object based on the determined result.

The detection sensor 200 may be disposed in a proper position at which an object, e.g., another vehicle, located in front, to a side, or to a front side of the vehicle 1 may be recognized, as shown in FIG. 1 and FIG. 2. In an embodiment, the detection sensor 200 may be disposed on the front and both sides of the vehicle 1 to recognize all objects located in front of the vehicle 1, in a direction between the left side and front (hereinafter, referred to as 'front-left') of the vehicle 1 and in a direction between the right side and the front (hereinafter, referred to as 'front-right') of the vehicle 1.

For example, a first detection sensor 200a may be disposed in a part, e.g., on the internal side of a radiator grill 6, or may be disposed at any place of the vehicle 1 allowing detection of a vehicle in front of the vehicle 1. Furthermore, a second detection sensor 200b may be disposed on a left side of the vehicle 1, and a third detection sensor 200c may be disposed on a right side of the vehicle 1.

The detection sensor 200 may detect whether another vehicle is present or approaching from the left side, right side, front-left side, or front-right side using electromagnetic waves or laser beams. For example, the detection sensor 200 may emit electromagnetic waves including micro waves or millimeter waves, pulsed laser beams, ultrasounds, or infrared rays in the left, right, front, back, front-left, front-right, rear-left, or rear-right direction, and detect whether there is an object by receiving electromagnetic waves, pulsed laser beams, ultrasounds, infrared rays, or the like, reflected or scattered from the object. In the present case, the detection sensor 200 may further determine a distance between the vehicle 1 and the object or moving speed of the object based on a time taken for the emitted electromagnetic waves, pulsed laser beams, or infrared rays to be returned.

Alternatively, the detection sensor 200 may detect whether there is an object by receiving visible rays reflected or scattered from the object located in the left, right, and front directions. As described above, depending on which one of electromagnetic waves, pulsed laser beams, ultrasounds, infrared rays, and visible rays is used, a recognized distance to the object located in front or back of the vehicle 1 may be different, and the weather or illumination may affect whether the object is recognized or not.

Taking the above into account, while the vehicle 1 is being driven in a certain direction along a certain lane, the controller 100 of the vehicle 1 may determine whether there are moving objects in front of the vehicle 1, and front-left and front-right sides to the vehicle 1, and obtain information about position and speed of the object.

The detection sensor 200 may be implemented with many different devices including a radar using millimeter waves or micro waves, a Light Detection And Ranging (LiDAR) using pulsed laser beams, a vision using visible rays, an infrared detector using infrared rays, an ultrasound detector using ultrasounds, and/or the like. The detection sensor 200 may be implemented with any one of the above or any combination of the above devices. When several detection sensors 200 may be mounted on the vehicle 1, the detection sensors 200 may be implemented with the same type or different types of devices. Besides, the detection sensors 200 may be implemented with other various devices or combinations of them that may be considered by the designer.

In another exemplary embodiment of the present invention, a plurality of detectors 201 are disposed in the rear of the vehicle 1 and configured to detect approaching vehicles and obstacles in the rear of the vehicle 1.

Referring to FIG. 3, in an internal 300 of the vehicle 1, there are a driver seat 301, a passenger seat 302 by the driver seat 301, a dashboard 310, a wheel 320, and an instrument panel 330.

The dashboard 310 refers to a panel that separates the internal compartment from the engine compartment which has various parts required for driving disposed thereon. The dashboard 310 is located in front of the driver seat 301 and passenger seat 302. The dashboard 310 may include a top panel, a center fascia 311, a gear box 315, and the like.

On the top panel of the dashboard 310, a display 303 may be disposed. The display 303 may present various information in a form of images to the driver or passenger of the vehicle 1. For example, the display 303 may visually present various information including maps, weather, news, various moving or still images, information regarding status or operation of the vehicle 1, e.g., information about the air conditioner, etc. Furthermore, the display 303 may provide the driver or passenger with an alert corresponding to a level of danger to the vehicle 1. When the vehicle 1 is about to change lanes, different alerts may be provided to the driver according to different levels of danger. The display 303 may be implemented with a commonly-used navigation system.

The display 303 may be disposed inside a housing integrally formed with the dashboard 310 wherein the display 303 may be exposed. Alternatively, the display 303 may be disposed in the middle or the lower portion of the center fascia 311, or may be disposed on the inside of the windshield or on the top portion of the dashboard 310 by a separate supporter. Besides, the display 303 may be disposed at any position that may be considered by the designer.

Behind the dashboard 310, various types of devices including a processor, a communication module, a Global Positioning System (GPS) module, a storage, etc., may be disposed. The processor disposed in the vehicle 1 may be configured to control various electronic devices provided in the vehicle 1, and may be configured as the controller 100. The aforementioned devices may be implemented using various parts including semiconductor chips, switches, integrated circuits, resistors, volatile or nonvolatile memories, PCBs, and/or the like.

The center fascia 311 may be disposed in the middle of the dashboard 310, and may have input device 318a to 318c for inputting various instructions related to the vehicle 1. The input device 318a to 318c may be implemented with mechanical buttons, knobs, a touch pad, a touch screen, a stick-type manipulation device, a trackball, or the like. The driver may control many different operations of the vehicle 1 by manipulating the input device 318a to 318c.

The gear box 315 is located below the center fascia 311 between the driver seat 301 and the passenger seat 302. In the gear box 315, a transmission 316, a container box 317, various input device 318d and 318e, etc., included. The input device 318d and 318e may be implemented with mechanical buttons, knobs, a touch pad, a touch screen, a stick-type manipulation device, a trackball, or the like. The container box 317 and input device 318d and 318e may be omitted in various exemplary embodiments.

The wheel 320 and an instrument panel 330 are located on the dashboard 310 in front of the driver seat 301.

The wheel 320 may be rotated in a certain direction by manipulation of the driver, and accordingly, the front or back wheels of the vehicle 1 are rotated, steering the vehicle 1. The wheel 320 includes a spoke 321 connected to a rotation shaft and a steering wheel combined with the spoke 321. On the spoke 321, there may be an input device for inputting various instructions, and the input device may be implemented with mechanical buttons, knobs, a touch pad, a touch screen, a stick-type manipulation device, a trackball, or the like. The steering wheel 322 may have a radial form to be conveniently manipulated by the driver, but is not limited thereto. Inside of at least one of the spoke 321 and the steering wheel 322, a vibrator 331 (in FIG. 3) may be disposed for allowing at least one of the spoke 321 and the steering wheel 322 to vibrate at a certain intensity according to an external control signal. In various exemplary embodiments, the vibrator 331 may vibrate at various intensities according to external control signals, and accordingly, at least one of the spoke 321 and the steering wheel 322 may vibrate at various intensities. With the function of the vibrator 331, the vehicle 1 may provide haptic alerts for the driver. For example, at least one of the spoke 321 and the steering wheel 322 may vibrate to an extent that corresponds to a level of danger determined when the vehicle 1 changes lanes. In the present way, various alerts may be provided to the driver. The higher the level of danger is, the stronger the at least one of the spoke 321 and the steering wheel 322 vibrates to provide a high level of alert to the driver.

Furthermore, a turn signal indicator input device 318f may be disposed in the back of the wheel 320. The user may input a signal to change driving direction or lanes through the turn signal indicator input device 318f while driving the vehicle 1.

The instrument panel 330 is formed to provide the driver with various information relating to the vehicle 1 including a speedometer, a tachometer, a fuel gauge, the temperature of the engine oil, a turn signals indicator, an odometer, etc. The instrument panel 330 may be implemented with lights, indicators, or the like, and it may be implemented with a display panel as well, in various exemplary embodiments. In the case that the instrument panel 330 is implemented with the display panel, in addition to the aforementioned information, the instrument panel 330 may provide other various information including gas mileage, whether various functions of the vehicle 1 are performed, or the like to the driver by displaying them. The instrument panel 330 may output and provide different alerts for the user based on different levels of danger to the vehicle 1. When the vehicle 1 changes lanes, the instrument panel 330 may provide different alerts to the driver based on differently determined levels of danger.

Referring to FIG. 4, the vehicle 1 in an exemplary embodiment may include a speed controller 70 configured for controlling the driving speed of the vehicle 1 driven by the driver, a speed detector 80 configured for detecting the driving speed of the vehicle 1, a steering angle detector 85 configured for detecting a rotation angle of the steering wheel 322, a yaw rate detector 88 configured for detecting a speed at which the rotation angle of the vehicle body is changed, a memory 90 configured for storing data related to the control of the vehicle 1, and a controller 100 configured for controlling the respective components of the vehicle 1 and the driving speed of the vehicle 1.

The speed controller 70 may control the speed of the vehicle 1 driven by the driver. The speed controller 70 may include an accelerator driver 71 and a brake driver 71.

The accelerator driver 71 may increase speed of the vehicle 1 by activating the accelerator upon reception of a control signal from the controller 100, and the brake driver 72 may decrease speed of the vehicle by activating the brake upon reception of a control signal from the controller 100.

The controller 100 may increase or decrease the driving speed of the vehicle 1 to increase or decrease the distance between the vehicle to an object based on the distance between the vehicle 1 and the object and a predetermined reference distance stored in the memory 90.

Furthermore, the controller 100 may determine an estimated collision time TTC of the vehicle 1 against the object based on the relative distance and relative speed between the vehicle 1 and the object, and may send a signal to control the driving speed of the vehicle 1 to the speed controller 70 based on the determined TTC.

The controller 100 may send a control signal to reduce driving speed of the vehicle 1 by activating Autonomous Emergency Brake (AEB), and the speed controller 70 may reduce the driving speed of the vehicle 1 based on the control signal to avoid a collision with an object located in front of the vehicle 1.

The speed controller 70 may control the driving speed of the vehicle 1 under the control of the controller 100, and may decrease the driving speed of the vehicle 1 when the risk of collision between the vehicle 1 and another vehicle is high.

The speed detector 80 may detect the driving speed of the vehicle 1 driven by the driver under the control of the controller 100. The speed detector 80 may detect the driving speed using the rotation speed of the wheels of the vehicle 1, and a unit of the driving speed may be represented in kph, meaning a distance (km) traveled per unit hour (h).

The steering angle detector 85 may detect a steering angle, which is a rotation angle of the steering wheel 322 while the vehicle 1 is driven, and the yaw rate detector 88 may detect the speed at which the rotation angle of the vehicle frame is changed while the vehicle 1 is driven.

The controller 100 may obtain slip information of the vehicle 1 on the move based on the detected steering angle and yaw rate. The controller 100 may receive yaw rates detected at regular intervals as many as certain times, average the yaw rates detected as many as certain times, obtain a turning angle by dividing the average of the yaw rates by certain time, and compare the angle of the steering wheel 322 corresponding to the steering wheel information and the turning angle to obtain a difference between the angle of the steering wheel 322 and the turning angle.

In the present regard, the difference between the angle of the steering wheel 322 and the turning angle corresponds to the slip information of the vehicle 1, including whether the vehicle 1 has slipped and a slip angle. The slip angle is an angle formed due to the speed at which the vehicle 1 side-slips while being driven, i.e., an angle of lateral speed to longitudinal speed. For example, the more eccentrically the vehicle 1 side-slips, the larger the slip angle is.

As will be described below, the controller 100 may estimate a slip angle and yaw rate to be made in a case that the vehicle 1 is steered to avoid a collision based on the information about slip angle and yaw rate obtained while being driven. The controller 100 may expect a steering-based avoidance path for the vehicle 1 to be steered to avoid a collision, and determine a slip angle and yaw rate to be formed in the case that the vehicle 1 is steered, based on the expected steering-based avoidance path.

The memory 90 may store various data related to the control of the vehicle 1. In an embodiment, the memory 90 may store information about the driving speed, traveled distance, and traveled time of the vehicle 1, and further store information about a type and position of an object detected by the capturer 350.

The memory 90 may store information about a position and speed of an object detected by the detection sensor 200, coordinate information of a moving object, which varies in real time, and information about a relative distance and relative speed between the vehicle 1 and an object.

The memory 90 may store data related to mathematical formulas and control algorithms used in controlling the vehicle 1 in an embodiment, and the controller 100 may send control signals to control the vehicle 1 according to the formulas and control algorithms.

Furthermore, as will be described below, the memory 90 may store information about the steering-based avoidance path established for the vehicle 1 to avoid a collision with a target vehicle located in front of the vehicle 1, information about the rotation angle of the steering wheel 322 obtained by the steering angle detector 85, and information about the yaw rate detected by the yaw rate detector 88.

Further, the memory 90 may store data about lateral acceleration and information about the estimated slip angle in the case that the vehicle 1 is steered, and may store first and second lateral acceleration thresholds to be compared with the maximum lateral acceleration of the vehicle 1.

The memory 90 may be implemented with at least one of a non-volatile memory device including cache, read only memory (ROM), programmable ROM (PROM), erasable programmable ROM (EPROM), electrically erasable programmable ROM (EEPROM), a volatile memory device including random access memory (RAM), or a storage medium including hard disk drive (HDD) or compact disk (CD) ROM, without being limited thereto. The memory 90 may be a memory implemented with a chip separate from the aforementioned processor in relation to the controller 100, or may be implemented integrally with the processor in a single chip.

Turning back to FIG. 1 and FIG. 4, at least one controller 100 may be disposed inside the vehicle 1. The controller 100 may perform electronic control over the respective components associated with operation of the vehicle 1.

The vehicle 1 and method for controlling the same in accordance with an exemplary embodiment will now be described in detail with reference to FIG. 5 to FIG. 12. For convenience of explanation, assume that an object located in front of the vehicle 1 is a target vehicle 2.

Figure 5:
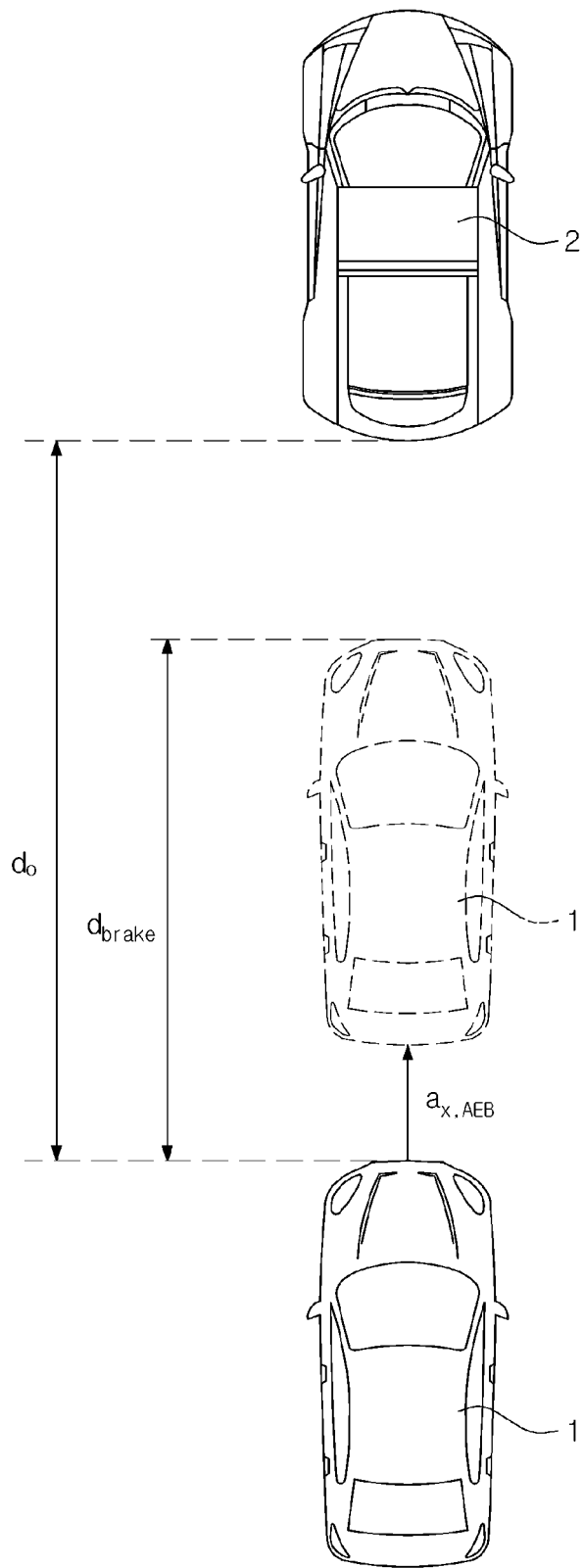
FIG. 5 is a conceptual diagram of an Autonomous Emergency Brake (AEB) of a vehicle, according to an exemplary embodiment of the present invention
Figure 6:
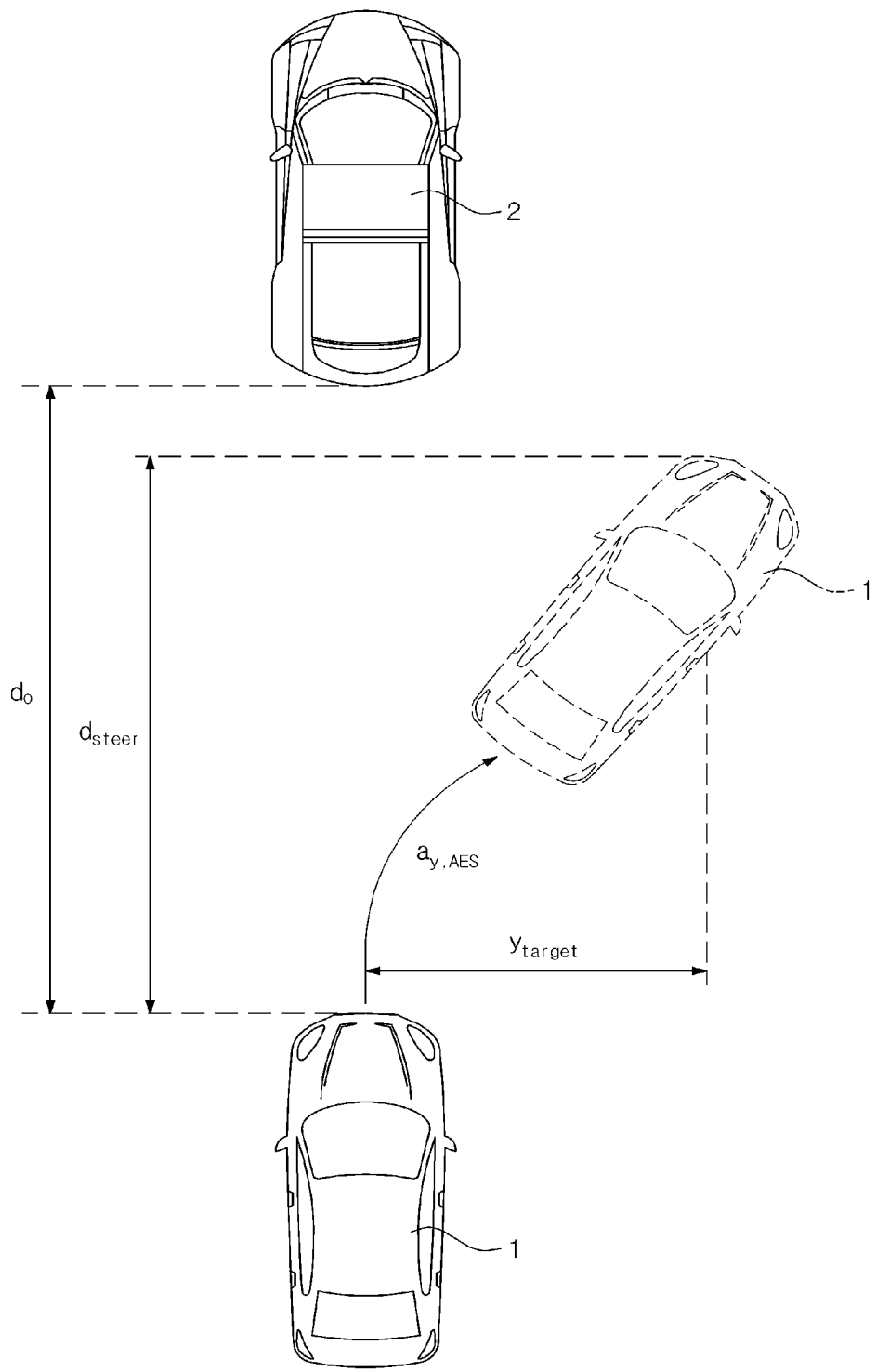
FIG. 6 is a conceptual diagram of an Autonomous Emergency Steering (AES) of a vehicle, according to an exemplary embodiment of the present invention.

FIG. 5 is a conceptual diagram of an Autonomous Emergency Brake (AEB) of a vehicle, according to an exemplary embodiment of the present invention, and FIG. 6 is a conceptual diagram of an Autonomous Emergency Steering (AES) of a vehicle, according to an exemplary embodiment of the present invention.

Referring to FIG. 5, the AEB may be implemented to avoid a collision with the target vehicle 2 located in front of the vehicle 1 on the move.

The AEB based collision avoidance system may determine an avoidance distance by braking $d_{brake}$ to reduce the speed of the vehicle 1 according to certain deceleration of braking to stop without collision between the vehicle 1 and the target vehicle 2.

As shown in FIG. 5, in a case that the vehicle 1 is a certain distance do away from the target vehicle 2, the controller 100 may send a control signal for brake-based avoidance to reduce the speed of the vehicle 1 at predetermined deceleration $a_{x,\ aEB}$ in the longitudinal direction to avoid a collision between the vehicle 1 and the target vehicle 2, and according to the control signal, the vehicle 1 may stop after being driven as far as the brake-based avoidance distance $d_{brake}$, avoiding a collision with the target vehicle 2.

According to the brake-based avoidance system, the brake-based avoidance distance $d_{brake}$ for brake-based avoidance of the vehicle 1 may be determined in the following equation 1:

$$d_{brake} = \frac{v_{x,rel}^2}{2a_{x,AEB}} \qquad \text{Equation 1}$$

where $v_{x,rel}$ denotes a relative speed of the vehicle 1 and the target vehicle 2, and $a_{x,\ aEB}$ denotes predetermined deceleration to reduce the driving speed of the vehicle 1 not to collide with the target vehicle 2.

For the controller 100 to be able to send the control signal for brake-based avoidance for the vehicle 1, the distance $d_0$ between the vehicle 1 and the target vehicle 2 needs to be longer than the brake-based avoidance distance $d_{brake}$. On the other hand, when the distance $d_0$ between the vehicle 1 and the target vehicle 2 is shorter than the brake-based avoidance distance $d_{brake}$, the controller 100 may not send the control signal for brake-based avoidance for the vehicle 1 because the vehicle 1 is unable to avoid a collision with the target vehicle 2 even when reducing the driving speed at the predetermined deceleration.

The controller 100 may determine a Last Point to Brake (LPB) that allows the vehicle 1 to avoid a collision by reducing the driving speed by emergency braking of the vehicle 1, and determine whether to send the control signal for brake-based avoidance based on a current distance between the vehicle 1 and the target vehicle 2.

Referring to FIG. 6, the AES may be implemented to avoid a collision with the target vehicle 2 located in front of the vehicle 1 on the move.

The AES based collision avoidance system may change a driving path of the vehicle 1 according to certain deceleration in a case that the vehicle 1 is steered, to determine a steering-based avoidance distance $d_{steer}$ for the vehicle 1 to avoid the target vehicle 2 without collision with the target vehicle 2.

As shown in FIG. 6, in a case that the vehicle 1 is a certain distance do away from the target vehicle 2, the controller 100 may send a control signal for steering-based avoidance to steer the vehicle 1 at predetermined deceleration $a_{y,\ aES}$ in a lateral direction to avoid a collision between the vehicle 1 and the target vehicle 2, and based on the control signal, the vehicle 1 may be driven to move as far as the steering-based avoidance distance $d_{steer}$ in the longitudinal direction and a target lateral moving distance $y_{target}$ in the lateral direction to change the path, avoiding a collision with the target vehicle 2.

According to the steering-based avoidance system, the longitudinal steering-based avoidance distance $d_{steer}$ for steering-based avoidance of the vehicle 1 may be determined in the following equation 2:

$$d_{steer} = v_{x,rel}\sqrt{\frac{2y_{target}}{a_{y,AES}}} \qquad \text{Equation 2}$$

Where $v_{x,rel}$ denotes a relative speed of the vehicle 1 and the target vehicle 2, and $a_{y,\ aES}$ denotes predetermined lateral acceleration in the event of steering-based avoidance of the vehicle 1.

For the controller 100 to send the control signal for steering-based avoidance for the vehicle 1, the distance $d_0$ between the vehicle 1 and the target vehicle 2 needs to be greater than the steering-based avoidance distance $d_{steer}$. On the other hand, when the distance $d_0$ between the vehicle 1 and the target vehicle 2 is shorter than the steering-based avoidance distance $d_{steer}$, the controller 100 may not send the control signal for steering-based avoidance for the vehicle 1 because the vehicle 1 is unable to avoid a collision with the target vehicle 2 even when being steered at the predetermined acceleration $a_{y,\ AES}$.

The controller 100 may determine a Last Point to Steer (LPS) that allows the vehicle 1 to avoid a collision with the target vehicle 2 by changing the driving path through steering-based avoidance, and determine whether to send the control signal for steering-based avoidance based on a current distance between the vehicle 1 and the target vehicle 2.

However, lateral acceleration to be generated in a case that the vehicle 1 changes the driving path through steering-based avoidance may be different from the predetermined lateral acceleration $a_{y,\,AES}$ as described above, the steering-based avoidance distance $d_{steer}$ may accordingly be different from a path in which the vehicle 1 actually performs steering-based avoidance.

Accordingly, a method for controlling the vehicle 1 in an exemplary embodiment of the present invention may include estimating lateral acceleration generated in a case of steering-based avoidance of the vehicle 1, and facilitating the controller 100 to control the steering-based avoidance of the vehicle 1 by comparing the estimated maximum lateral acceleration with a predetermined lateral acceleration threshold.

The lateral acceleration to be generated when the vehicle 1 is steered to avoid a collision with the target vehicle 2 may be determined through Model Predictive Control (MPC) that performs comprehensive determinations based on information about position and speed of the target vehicle 2 obtained by the detection sensor 200 and the capturer 350, and information about a road on which the vehicle 1 is driven.

Figure 7:
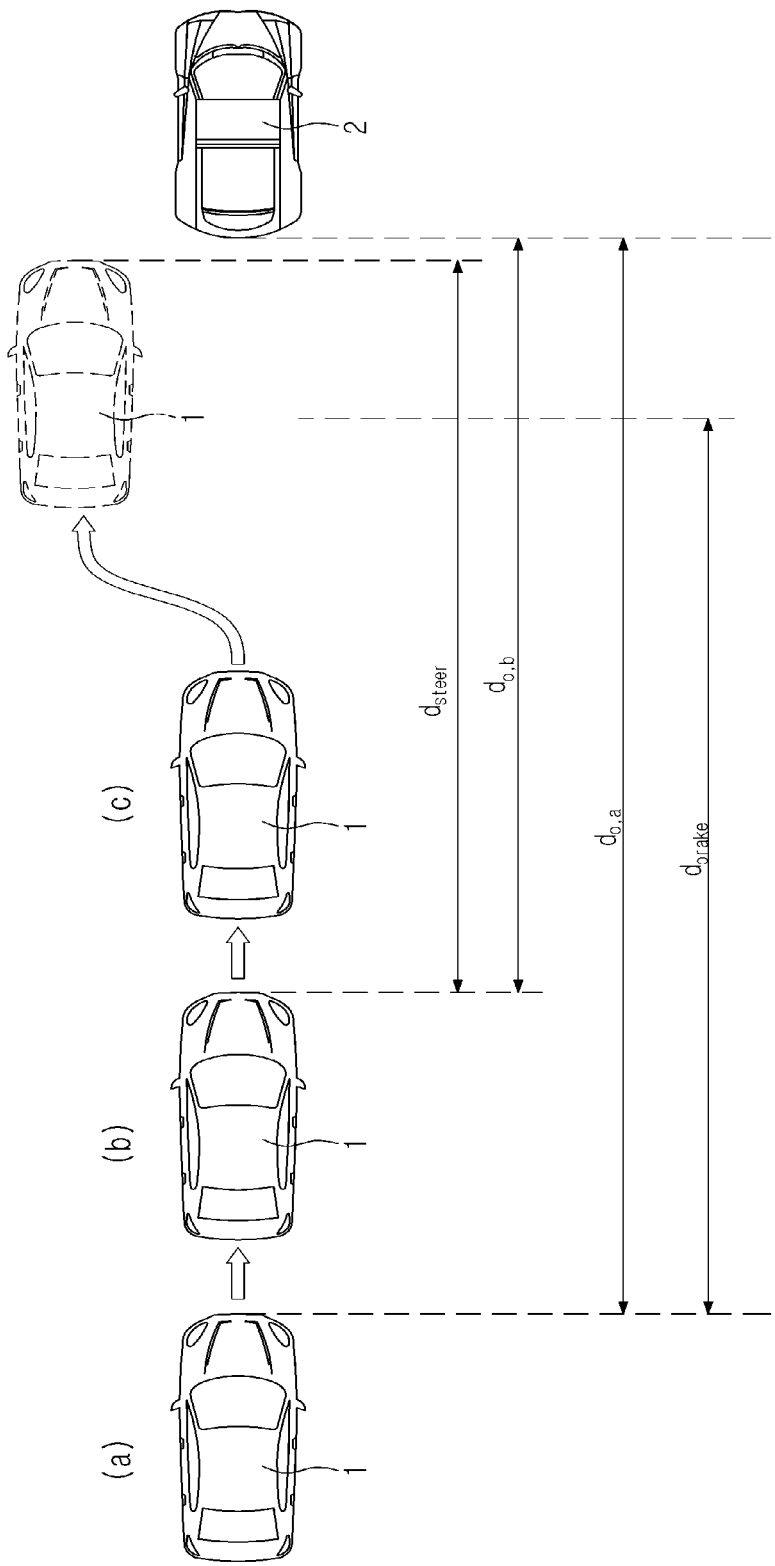
FIG. 7 is a conceptual diagram illustrating brake-based avoidance control or steering-based avoidance control based on a distance between a vehicle and a target vehicle, according to an exemplary embodiment of the present invention.

FIG. 7 is a conceptual diagram illustrating brake-based avoidance control or steering-based avoidance control based on a distance between a vehicle and a target vehicle, according to an exemplary embodiment of the present invention.

As described above with reference to FIG. 5 and FIG. 6, for the controller 100 to be able to send the control signal for brake-based avoidance for the vehicle 1 to apply the brake to avoid a collision with the target vehicle 2, the distance $d_0$ between the vehicle 1 and the target vehicle 2 needs to be greater than the brake-based avoidance distance $d_{brake}$. Furthermore, for the controller 100 to be able to send the control signal for steering-based avoidance for the vehicle 1 to avoid a collision with the target vehicle 2 through steering-based avoidance, the distance do between the vehicle 1 and the target vehicle 2 needs to be greater than the steering-based avoidance distance $d_{steer}$.

For example, referring to FIG. 7, in a case that the vehicle 1 is located at (a), since the distance $d_{0,\,a}$ between the vehicle 1 and the target vehicle 2 is longer than the brake-based avoidance distance $d_{brake}$, the controller 100 may be able to send a control signal for brake-based avoidance for the vehicle 1. The brake-based avoidance distance $d_{brake}$ is a distance required for the vehicle 1 to reduce the driving speed and stop before colliding with the target vehicle 2, which may be changed based on at least one of a relative distance and relative speed of the vehicle 1 and the target vehicle 2.

When the vehicle 1 is located at (b), since the distance $d_{0,b}$ between the vehicle 1 and the target vehicle 2 is shorter than the brake-based avoidance distance $d_{brake}$, the controller 100 may not be able to send a control signal for brake-based avoidance for the vehicle 1. In various exemplary embodiments, the brake-based avoidance distance $d_{brake}$ may be different from what is shown in FIG. 7. For example, in the case that the vehicle 1 is located at (b), when the distance between the vehicle 1 and the target vehicle 2 is shorter than the brake-based avoidance distance for the vehicle 1 to avoid a collision through braking, the controller 100 may not be able to send a control signal for brake-based avoidance for the vehicle 1.

In the meantime, when the vehicle 1 is located at (b), since the distance $d_{0,b}$ between the vehicle 1 and the target vehicle 2 is longer than the steering-based avoidance distance $d_{steer}$, the controller 100 may determine whether to perform steering-based avoidance control of the vehicle 1 at position (b). Furthermore, the controller 100 may send a control signal for steering-based avoidance for the vehicle 1 at position (c) to change the driving path by being steered, as shown in FIG. 7, avoiding a collision with the target vehicle 2. In other words, when the vehicle 1 is located at (b), the controller 100 may determine to send a control signal for steering-based avoidance for the vehicle 1, but may send the control signal for steering-based avoidance when the vehicle 1 is located at (c) without sending it at (b) because the driver of the vehicle 1 may steer the vehicle 1 by his or her self at (b).

Figure 8:
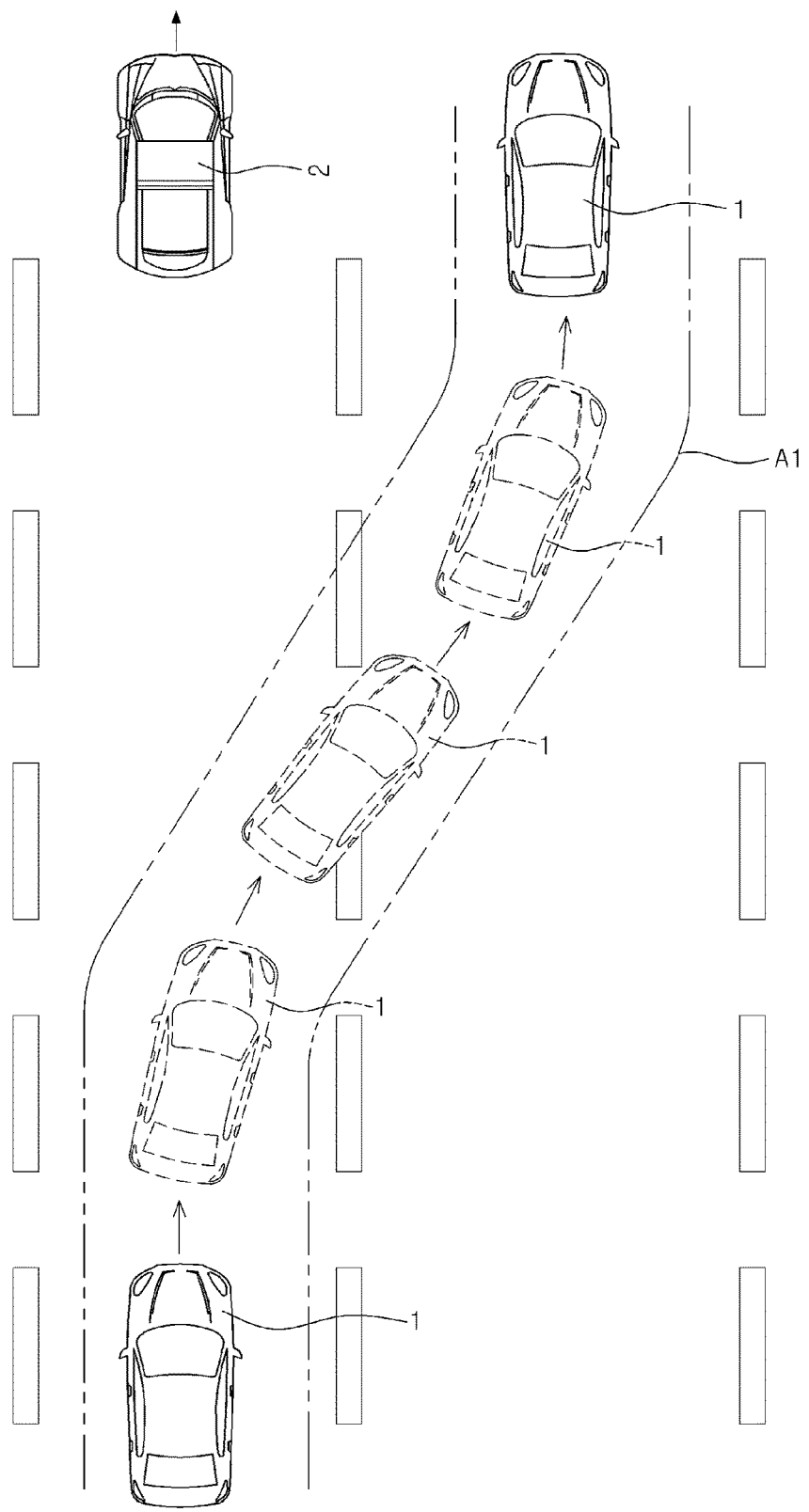
FIG. 8 and FIG. 9 show how to determine a steering-based avoidance path for a vehicle to avoid a target vehicle, according to an exemplary embodiment of the present invention.
Figure 9:
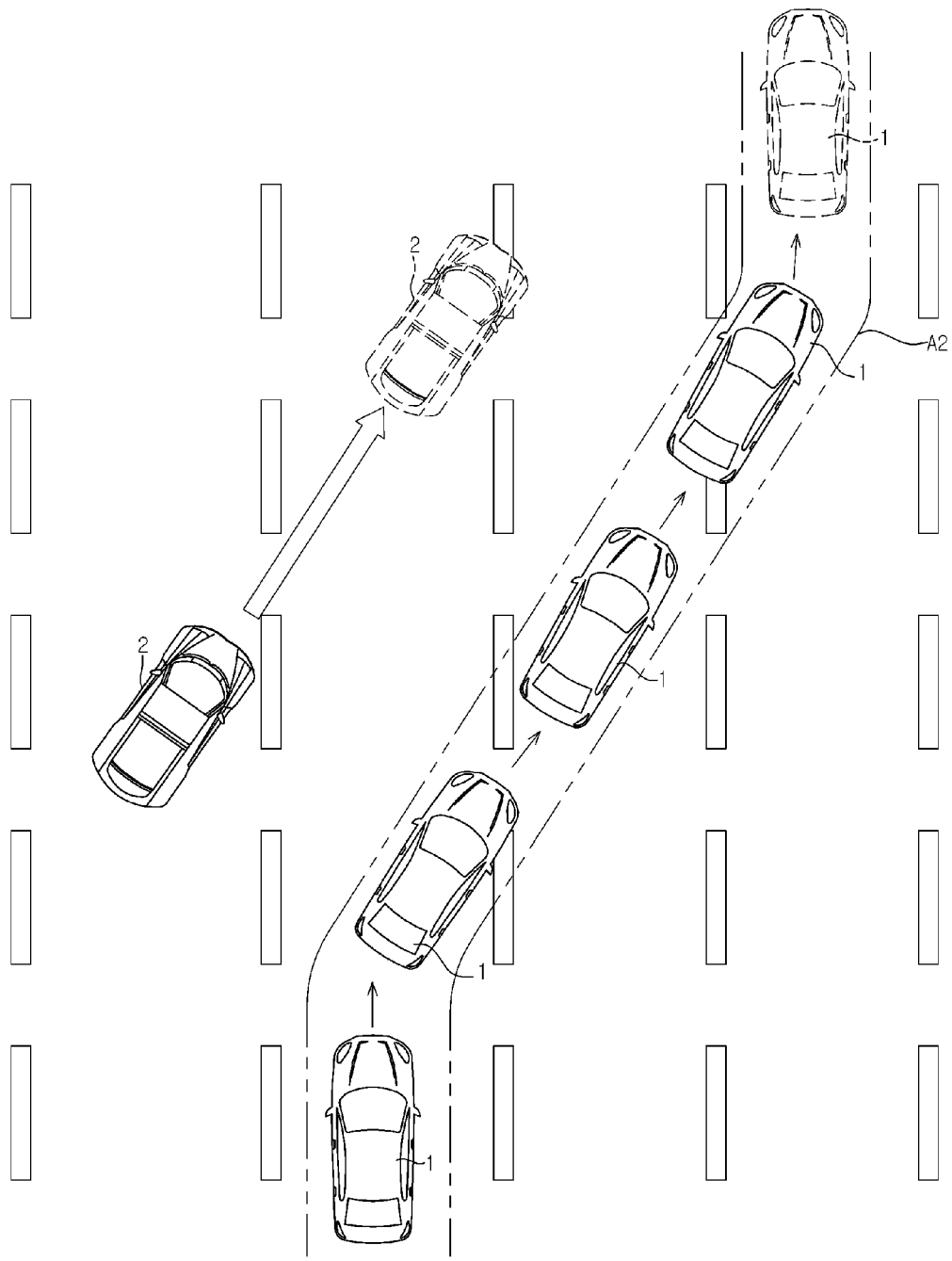

FIG. 8 and FIG. 9 show how to determine a steering-based avoidance path for a vehicle to avoid a target vehicle, according to an exemplary embodiment of the present invention.

Referring to FIG. 8 and FIG. 9, the controller 100 may estimate a driving path of the target vehicle 2 based on at least one of position information and speed information of the target vehicle 2 obtained by the detection sensor 200 or the capturer 350.

The detection sensor 200 may detect the target vehicle 2 located in front of the vehicle 1 and obtain information about a current position and driving speed of the target vehicle 2, and the information about the driving speed may include information about a driving direction of the target vehicle 2. The capturer 350 of the vehicle 1 may also obtain the information about the position and speed of the target vehicle 2 by taking pictures of the target vehicle 2 in real time.

The controller 100 may expect the driving path of the target vehicle 2 on the assumption that the target vehicle 2 is being driven while maintaining the current driving speed and direction, based on at least one of the position information and speed information of the target vehicle 2.

In FIG. 8, since the target vehicle 2 is driven in the longitudinal direction on the same lane as with the vehicle 1, the controller 100 of the vehicle 1 may expect the driving path of the target vehicle 2 to be in the same longitudinal direction as the current driving direction.

In FIG. 9, since the target vehicle 2 is driven in a diagonal path toward a lane on which the vehicle 1 is being driven from a lane on the left of the lane on which the vehicle 1 is being driven, the controller 100 of the vehicle 1 may expect the driving path of the target vehicle 2 to cross the lane on which the vehicle 1 is being driven.

Once the driving path of the target vehicle 2 is expected, the controller 100 may determine a steering-based avoidance path for the vehicle 1 based on the expected driving path. In other words, a path may be determined for the vehicle 1 to be steered to avoid the driving path of the target vehicle 2 to avoid a collision with the target vehicle 2.

The controller 100 may use information about a road map stored in the memory 90 in determining the steering-based avoidance path of the vehicle 1, and determine the steering-based avoidance path based on information about road lanes detected by the detection sensor 200 or the capturer 350.

As shown in FIG. 8, to avoid a collision with the target vehicle 2 driven in the longitudinal direction on the same lane as with the vehicle 1, the controller 100 may determine steering-based avoidance path A1 that deviates from the driving path of the target vehicle 2 and changes the driving path of the vehicle 1 to a lane on the right.

Furthermore, as shown in FIG. 9, to avoid a collision with the target vehicle 2 driven on a diagonal path running across the lane in which the vehicle 1 is being driven, the controller 100 may determine steering-based avoidance path A2 that deviates from the lane that the target vehicle 2 may pass and changes the driving path of the vehicle 1 to the second lane to the right.

Figure 10:
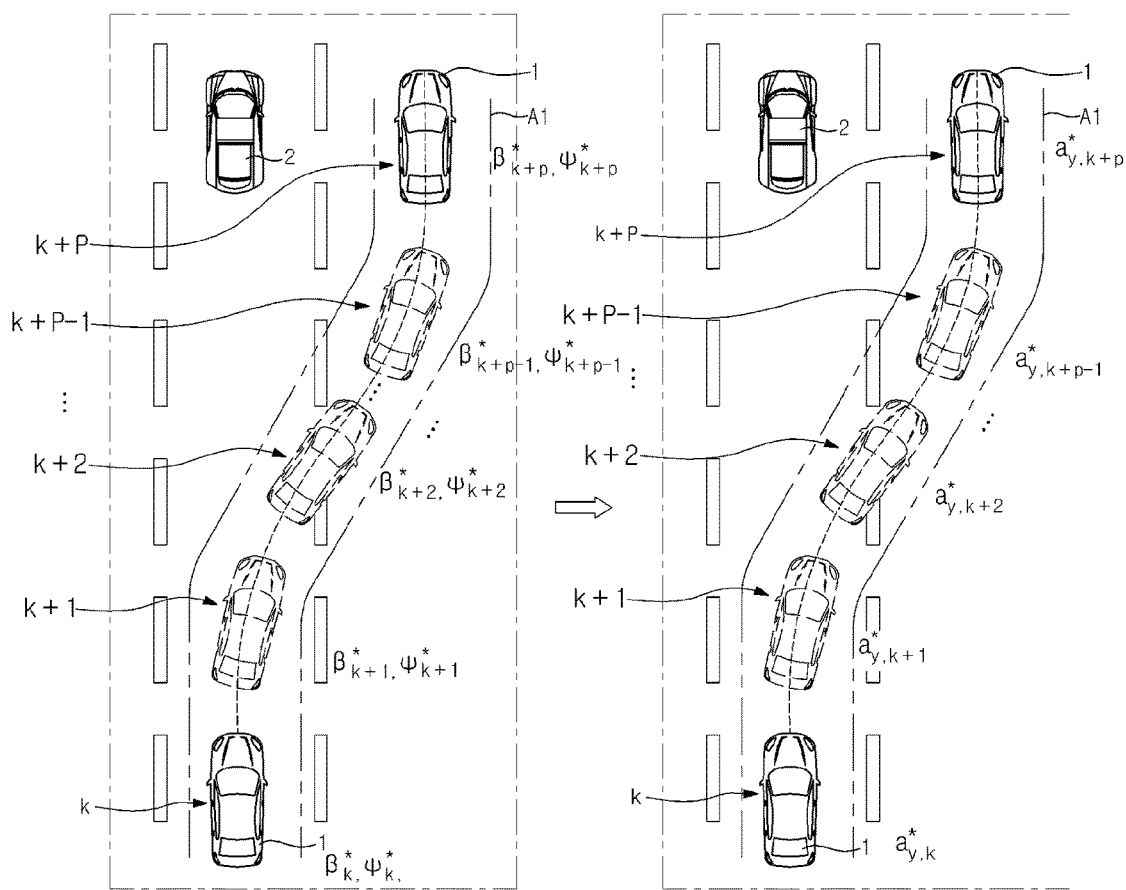
FIG. 10 is a conceptual diagram illustrating how to determine lateral acceleration in the event of steering-based avoidance of a vehicle, according to an exemplary embodiment of the present invention.

FIG. 10 is a conceptual diagram illustrating how to determine lateral acceleration in the event of steering-based avoidance of a vehicle, according to an exemplary embodiment of the present invention.

FIG. 10 gives an explanation of how lateral acceleration of the vehicle 1 is determined in the case that the vehicle 1 is driven for steering-based avoidance along the steering-based avoidance path A1 determined based on the driving path of the target vehicle 2 expected as described with reference to FIG. 8.

As shown in FIG. 10, in the case that the vehicle 1 is driven along the steering-based avoidance path A1 to avoid a collision with the target vehicle 2, the time-varying locations of the vehicle 1 may be assumed to be k, k+1, k+2, . . . , k+p−1, k+p.

The controller 100 may determine a slip angle β and a yaw rate ψ of the vehicle 1 based on the time-varying locations of the vehicle 1 that lie in the steering-based avoidance path A1 on which the vehicle 1 is driven.

The controller 100 may estimate the slip angle β and yaw rate ψ to be made when the vehicle 1 is steered in the steering-based avoidance path A1, based on information about the slip angle β and yaw rate ψ obtained while the vehicle 1 is driven.

Referring to FIG. 10, in the case that the vehicle 1 is driven in the steering-based avoidance path A1 to avoid a collision with the target vehicle 2, given that the time-varying locations of the vehicle 1 are k, k+1, k+2, . . . , k+p−1, k+p, slip angles at the locations of the vehicle 1 may be determined to be $\beta^*_k, \beta^*_{k+1}, \beta^*_{k+2}, \ldots, \beta^*_{k+p-1}, \beta^*_{k+p}$, respectively. Yaw rates at the locations of the vehicle 1 may also be determined to be $\psi^*_k, \psi^*_{k+1}, \psi^*_{k+2}, \ldots, \psi^*_{k+p-1}, \psi^*_{k+p}$, respectively.

The controller 100 may determine lateral acceleration to be generated when the vehicle 1 is driven in the steering-based avoidance path A1 based on the determined slip angle β and yaw rates ψ, and the lateral acceleration at the respective locations of the vehicle 1 may be determined to be $a^*_{y,k}, a^*_{y,k+1}, a^*_{y,k+2}, \ldots, a^*_{y,k+p-1}, a^*_{y,k+p}$.

For example, the controller 100 may determine the lateral acceleration of the vehicle 1 in the following equation 3 based on the slip angle β and yaw rates ψ estimated in the case that the vehicle 1 is driven in the steering-based avoidance path A1 to avoid a collision with the target vehicle 2.

$$a^*_{y,k+i} = \frac{(\beta^*_{k+i} - \beta^*_{k+i-1})}{dt} v_x + \psi^*_{k+i} v_x \quad \text{Equation 3}$$

The locations of the vehicle 1 may be represented from i=0 to i=p while the vehicle 1 is driven in the steering-based avoidance path A1, and the point p corresponds to an end point at which the vehicle 1 finishes changing of the driving path to avoid a collision with the target vehicle 2.

The controller 100 may determine a maximum value of the estimated lateral acceleration $a^*_{y,k}, a^*_{y,k+1}, a^*_{y,k+2}, \ldots, a^*_{y,k+p-1}, a^*_{y,k+p}$ when vehicle 1 is driven in the steering-based avoidance path A1. The maximum value of the lateral acceleration of the vehicle 1 refers to the highest value among lateral accelerations that may be generated in the case that the vehicle 1 is driven in the steering-based avoidance path A1.

The controller 100 may determine whether to send a control signal for steering-based avoidance to avoid a collision between the vehicle 1 and the target vehicle 2, based on the maximum lateral acceleration of the vehicle 1.

Figure 11:
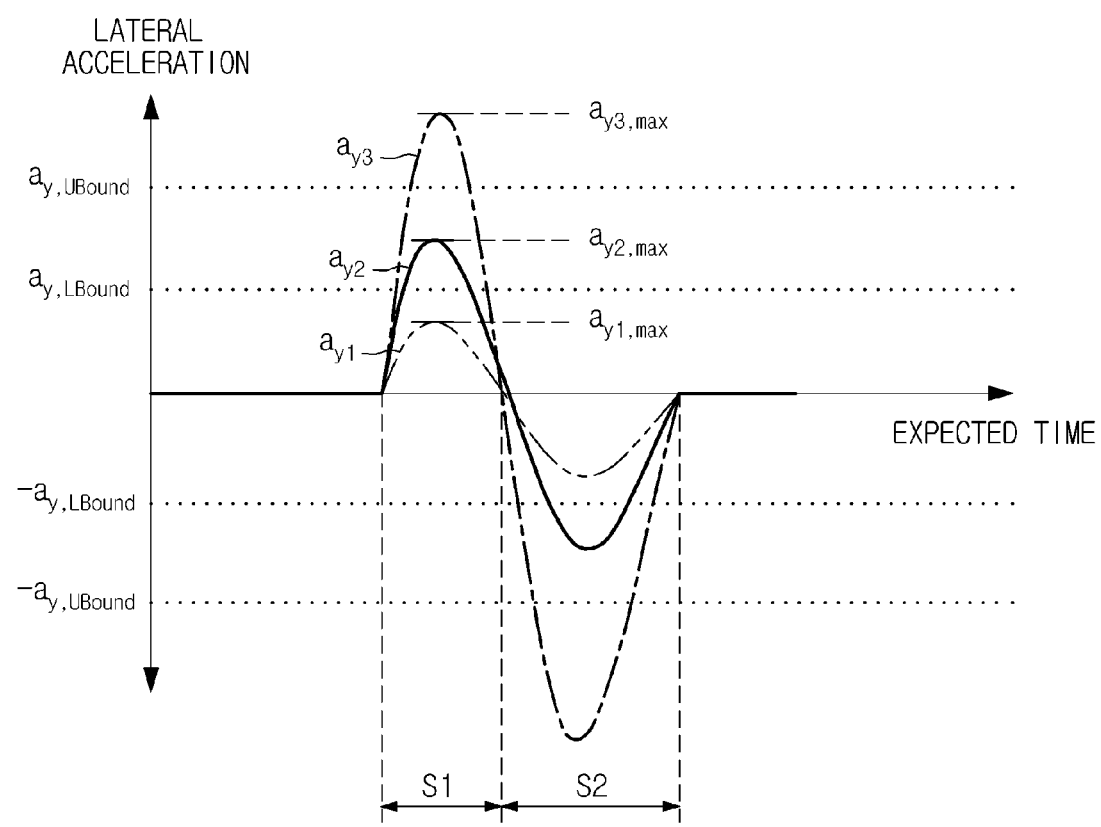
FIG. 11 is a graph for determination of whether to send a control signal for steering-based avoidance based on the maximum lateral acceleration of a vehicle, according to an exemplary embodiment of the present invention.
Figure 12:
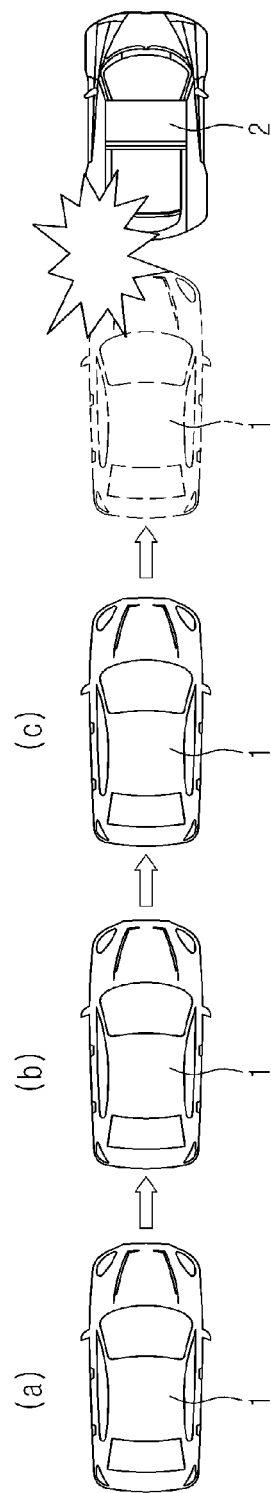
FIG. 12 is a conceptual diagram illustrating brake-based avoidance control to minimize damage in the event of a collision between a vehicle and a target vehicle.

FIG. 11 is a graph for determination of whether to send a control signal for steering-based avoidance based on the maximum lateral acceleration of a vehicle 1, according to an exemplary embodiment of the present invention. FIG. 12 is a conceptual diagram illustrating brake-based avoidance control to minimize damage in the event of a collision between a vehicle and a target vehicle.

In FIG. 11, the time-varying lateral acceleration on the steering-based avoidance path A1 is represented in plots, in the case that the vehicle 1 performs steering-based avoidance control to avoid a collision with the target vehicle 2.

In the present regard, the form of the plot of the lateral acceleration may vary depending on the extent of steering-based avoidance of the vehicle 1 against the target vehicle 2. As for a plot $a_{y1}$ of the lateral acceleration to be generated by steering of the vehicle 1, the maximum lateral acceleration to be generated while the vehicle 1 is performing steering-based avoidance control in the steering-based avoidance path A1 corresponds to $a_{y1,max}$.

Likewise, as for a plot $a_{y2}$ of the lateral acceleration to be generated by steering of the vehicle 1, the maximum lateral acceleration to be generated while the vehicle 2 is performing steering-based avoidance control in the steering-based avoidance path A1 corresponds to $a_{y2,max}$, and as for a plot $a_{y3}$ of the lateral acceleration to be generated by steering of the vehicle 1, the maximum lateral acceleration to be generated while the vehicle 3 is performing steering-based avoidance control in the steering-based avoidance path A1 corresponds to $a_{y3,max}$.

The controller 100 may determine whether to send a control signal for steering-based avoidance for the vehicle 1 by comparing the maximum lateral acceleration to be generated in the case that the vehicle 1 is steered in the steering-based avoidance path A1 with predetermined first and second lateral acceleration thresholds.

The first lateral acceleration threshold $a_{y,LBound}$ is a maximum value of the lateral acceleration that may be generated in a case that the vehicle 1 is driven normally, and the second lateral acceleration threshold $a_{y,UBound}$ is a maximum value of the lateral acceleration that may be generated in a case that the driven vehicle 1 is steered.

Furthermore, as shown in FIG. 10, in the case of steering-based avoidance control for the vehicle 1 to avoid the target vehicle 2, the steering wheel 322 may be turned to the right to change the driving path from the current driving lane to a lane on the right, and then turned to the left to drive the vehicle 1 to run on the right lane, in which case the lateral acceleration of the vehicle 1 may be generated on the right and then left.

Referring to FIG. 10 and FIG. 11, when the vehicle 1 is steered to a lane on the right of the current driving lane of the vehicle 1, the steering wheel 322 is turned to the right at k+1, generating lateral acceleration in the right direction, which may be represented as S1 in the graph of FIG. 11.

Moreover, assuming that the steering wheel 322 is turned to the left at k+P−1 for the vehicle 1 that has changed the driving path to the lane on the right to be driven in the right lane, lateral acceleration in the left direction is generated, which may be represented as S2 in the graph of FIG. 11.

The controller 100 may not send the control signal for steering-based avoidance for the vehicle 1 when the maximum lateral acceleration to be generated in the event of steering-based avoidance control of the vehicle 1 is equal to or less than the first lateral acceleration threshold $a_{y,LBound}$. The maximum lateral acceleration of the vehicle 1 to be generated in the event of steering-based avoidance control of the vehicle 1 being equal to or less than the first lateral acceleration threshold $a_{y,LBound}$ means that the vehicle 1 is configured to avoid the target vehicle 2 at low lateral acceleration, in which case since the driver may perform the steering-based avoidance control by controlling the vehicle 1 by his or her self, the controller 1 may not send the control signal for steering-based avoidance for the vehicle 1.

Referring to FIG. 11, in the case that the maximum lateral acceleration of the vehicle 1 estimated by the controller 100 is $a_{y1,max}$, which is equal to or less than the first lateral acceleration threshold $a_{y,LBound}$, the controller 100 may not send the control signal for steering-based avoidance for the vehicle 1.

The controller 100 may send the control signal for steering-based avoidance for the vehicle 1 when the maximum of the lateral acceleration to be generated in the event of steering-based avoidance control of the vehicle 1 exceeds the first lateral acceleration threshold $a_{y,LBound}$ but is less than the second lateral acceleration threshold $a_{y,UBound}$. The maximum lateral acceleration of the vehicle 1 exceeding the first lateral acceleration threshold $a_{y,LBound}$ but being less than the second lateral acceleration threshold $a_{y,UBound}$ means that the vehicle 1 is not that far away from the target vehicle 2 for the driver to be able to control the vehicle 1 to be under the steering-based avoidance control, but that the controller 100 may perform the steering-based avoidance control to avoid a collision between the vehicle 1 and the target vehicle 2, so the controller 100 may send the control signal for steering-based avoidance for the vehicle 1.

Referring to FIG. 11, in the case that the maximum lateral acceleration of the vehicle 1 estimated by the controller 100 is $a_{y2,max}$, which exceeds the first lateral acceleration threshold $a_{y,LBound}$ but is less than the second lateral acceleration threshold $a_{y,UBound}$, the controller 100 may send the control signal for steering-based avoidance for the vehicle 1.

The controller 100 may not send the control signal for steering-based avoidance for the vehicle 1 when the maximum lateral acceleration to be generated in the event of steering-based avoidance control of the vehicle 1 is equal to or greater than second lateral acceleration threshold $a_{y,UBound}$. The maximum lateral acceleration being equal to or greater than second lateral acceleration threshold $a_{y,UBound}$ means that the vehicle 1 exceeds the acceleration threshold in relation to performing collision avoidance against the target vehicle 2 through steering-based avoidance, so the vehicle 1 may not avoid a collision with the target vehicle 2 even when the controller 100 performs the steering-based avoidance control for the vehicle 1.

Referring to FIG. 11, in the case that the maximum lateral acceleration of the vehicle 1 estimated by the controller 100 is $a_{y3,max}$, which is equal to or greater than the second lateral acceleration threshold $a_{y,UBound}$, the controller 100 may not send the control signal for steering-based avoidance for the vehicle 1.

In the present case, instead of sending the control signal for steering-based avoidance for the vehicle 1, the controller 100 may perform brake-based avoidance control to reduce the driving speed of the vehicle 1 to a predetermined speed.

Referring to FIG. 12, in the case that the controller 100 determines not to send a control signal for steering-based avoidance based on the maximum lateral acceleration for steering-based avoidance for the vehicle 1, since the vehicle 1 may not avoid a collision with the target vehicle 2, brake-based avoidance control may be performed to reduce the driving speed of the vehicle 1 to minimize damage even when the vehicle 1 collides with the target vehicle 2.

The speed controller 70 of the vehicle 1 may reduce the driving speed of the vehicle 1 based on the control signal for brake-based avoidance, which is sent by the controller 100.

Figure 13:
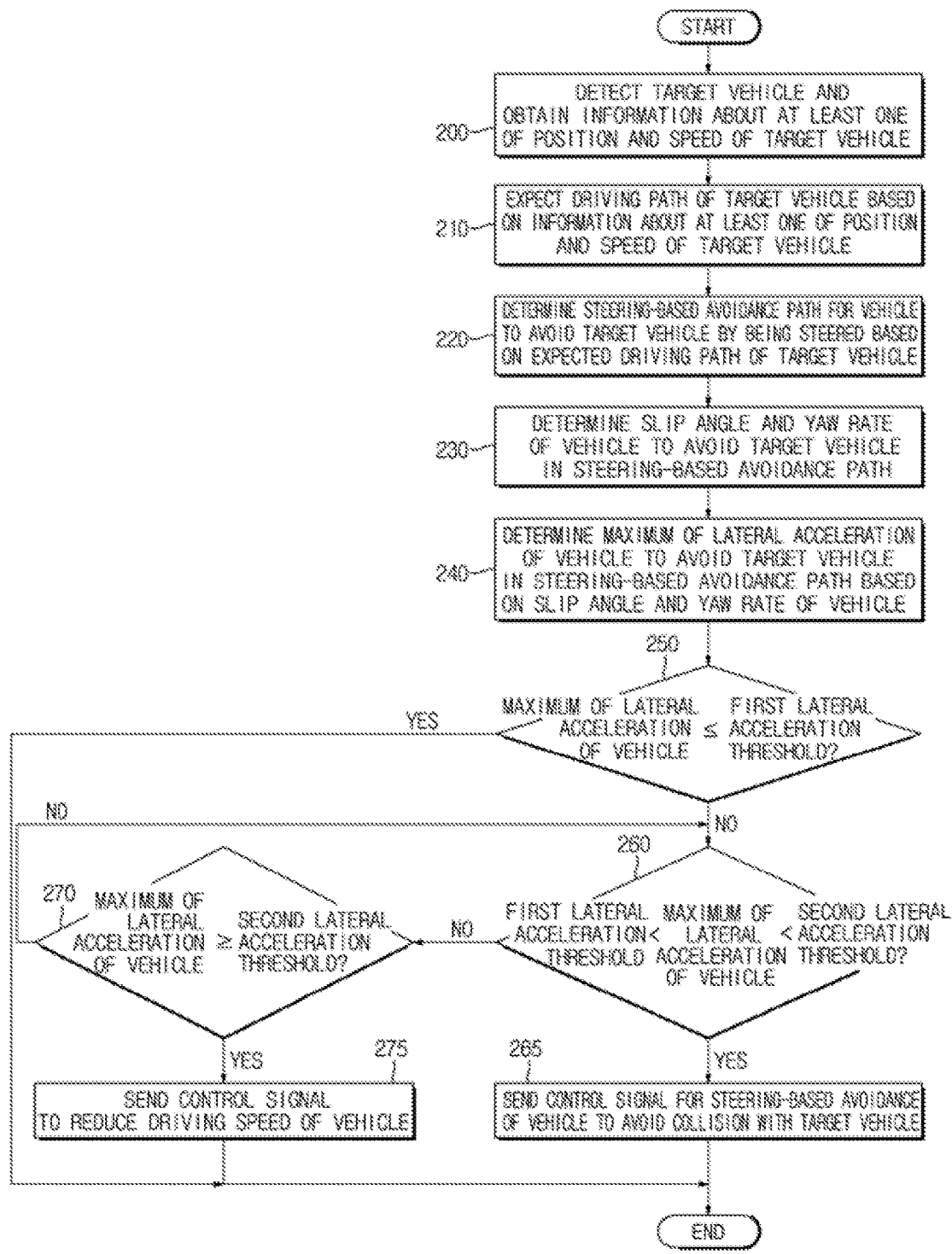
FIG. 13 is a flowchart illustrating a method for controlling a vehicle, according to an exemplary embodiment of the present invention.

FIG. 13 is a flowchart illustrating a method for controlling a vehicle, according to an exemplary embodiment of the present invention.

The detection sensor 200 may detect the target vehicle 2 located in front of the vehicle 1 to obtain at least one of position information and speed information of the target vehicle 2, in S200. The capturer 350 of the vehicle 1 may also determine the information about the position and speed of the target vehicle 2 in real time by taking pictures of the target vehicle 2.

The controller 100 may expect an estimated driving path of the target vehicle 2 based on at least one of the position information and the speed information of the target vehicle 2 in S210, and based on the expectation result, may determine the steering-based avoidance path A1 for the vehicle 1 to avoid the target vehicle 2 by being steered, in S220.

The controller 100 may determine a slip angle and yaw rate of the vehicle 1 to avoid the target vehicle 2 through the steering-based avoidance path A1 in S230, and once the slip angle and yaw rate are determined, based on the determination results, the controller 100 may determine a maximum lateral acceleration of the vehicle 1 to avoid the target vehicle 2 through the steering-based avoidance path A1 in S240. The present was described with reference to FIG. 10, so the overlapping description will be omitted below.

The controller 100 may compare the maximum lateral acceleration to be generated in the case that the vehicle 1 is steered into the steering-based avoidance path A1 with the predetermined first and second lateral acceleration thresholds $a_{y,LBound}$ and $a_{y,UBound}$. When the controller 100 determines that the maximum lateral acceleration of the vehicle 1 is equal to or less than the first lateral acceleration threshold $a_{y,LBound}$ in S250, the controller 100 may not send a control signal for steering-based avoidance for the vehicle 1 but the driver may steer the vehicle 1 to avoid a collision with the target vehicle 2.

When the controller 100 determines that the maximum lateral acceleration of the vehicle 1 exceeds the first lateral acceleration threshold $a_{y,LBound}$ but is less than the second lateral acceleration threshold $a_{y,UBound}$ in S260, the controller 100 may send a control signal for steering-based avoidance for the vehicle 1 to avoid a collision with the target vehicle 2 in S265.

Furthermore, when the controller 100 determines that the maximum lateral acceleration of the vehicle 1 is equal to or greater than the second lateral acceleration threshold $a_{y,UBound}$ in S270, the controller 100 may not send a control signal for steering-based avoidance for the vehicle 1 but send a control signal to reduce the driving speed of the vehicle 1 in S275 to perform brake-based avoidance control to reduce damage when the vehicle 1 collides with the target vehicle 2.

Embodiments of the present invention have an advantage of being able to perform collision avoidance control through timely steering of a vehicle by estimating lateral acceleration to be generated in a case that the vehicle is steered to avoid a collision with another vehicle to accurately determine points in time to be able to, or unable to, avoid collisions.

Meanwhile, the embodiments of the present invention may be implemented in a form of recording media for storing instructions to be conducted by a computer. The instructions may be stored in a form of program codes, and when executed by a processor, may generate program modules to perform operation in the exemplary embodiments of the present invention. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
a speed detector configured to detect driving speed of the vehicle; a detection sensor configured to detect a target vehicle around the vehicle and obtain information about at least one of position and speed of the target vehicle; and
a controller configured to determine a steering-based avoidance path for the vehicle to avoid the target vehicle by being steered, determine a maximum lateral acceleration of the vehicle for the vehicle to avoid the target vehicle in the steering-based avoidance path, and send a control signal of steering the vehicle for steering-based avoidance of the vehicle to avoid a collision with the target vehicle based on the determined maximum lateral acceleration,
wherein the controller is configured to compare the determined maximum lateral acceleration of the vehicle with predetermined first and second lateral acceleration thresholds, and send the control signal of steering the vehicle for the steering-based avoidance of the vehicle when the maximum lateral acceleration of the vehicle exceeds the first lateral acceleration threshold and is less than the second lateral acceleration threshold.

2. The vehicle of claim 1, wherein the controller is configured to expect a driving path of the target vehicle based on the information about at least one of the detected position and speed of the target vehicle, and determine the steering-based avoidance path based on the expected driving path of the target vehicle.

3. The vehicle of claim 1, wherein the controller is configured to determine the steering-based avoidance path based on information about lanes on a road on which the vehicle is being driven.

4. The vehicle of claim 1, wherein the controller is configured to determine a slip angle and a yaw rate of the vehicle to avoid the target vehicle in the steering-based avoidance path.

5. The vehicle of claim 4, wherein the controller is configured to determine the maximum lateral acceleration of the vehicle based on the determined slip angle and yaw rate of the vehicle.

6. The vehicle of claim 1, wherein the controller is configured to not send the control signal for steering-based avoidance of the vehicle, when the maximum lateral acceleration of the vehicle is equal to or less than the first lateral acceleration threshold or equal to or greater than the second lateral acceleration threshold.

7. The vehicle of claim 1, wherein the controller is configured to send the control signal to reduce driving speed of the vehicle, when the maximum lateral acceleration of the vehicle is equal to or greater than the second lateral acceleration threshold.

8. The vehicle of claim 1, wherein the first lateral acceleration threshold includes a highest value of lateral acceleration to be generated while the vehicle is driven, and
wherein the second lateral acceleration threshold includes a highest value of lateral acceleration to be generated by steering while the vehicle is driven.

9. The vehicle of claim 1, further including a speed controller configured to control driving speed of the vehicle.

10. The vehicle of claim 1, wherein the detection sensor includes one of a radar and a Light Detection And Ranging (LiDAR).

11. A method for controlling a vehicle, the method including:
detecting, by a detection sensor, a target vehicle around the vehicle and obtaining information about at least one of position and speed of the target vehicle;
expecting, by a controller, a driving path of the target vehicle based on the information about at least one of the position and speed of the target vehicle;
determining, by the controller, a steering-based avoidance path for the vehicle to avoid the target vehicle by being steered, based on the expected driving path of the target vehicle;
determining, by the controller, a maximum lateral acceleration of the vehicle to avoid the target vehicle in the steering-based avoidance path;
comparing, by the controller, the determined maximum lateral acceleration of the vehicle with predetermined first and second lateral acceleration thresholds; and
sending, by the controller, a control signal of steering the vehicle for the steering-based avoidance of the vehicle when the maximum lateral acceleration of the vehicle exceeds the first lateral acceleration threshold and is less than the second lateral acceleration threshold.

12. The method of claim 11, wherein determining the steering-based avoidance path includes:
determining the steering-based avoidance path based on information about lanes on a road on which the vehicle is being driven.

13. The method of claim 11, further including determining a slip angle and a yaw rate of the vehicle to avoid the target vehicle in the steering-based avoidance path.

14. The method of claim 13, further including determining the maximum lateral acceleration of the vehicle based on the determined slip angle and yaw rate of the vehicle.

15. The method of claim 11, further including not sending the control signal for the steering-based avoidance of the vehicle, when the maximum lateral acceleration of the vehicle is equal to or less than the first lateral acceleration threshold or equal to or greater than the second lateral acceleration threshold.

16. The method of claim 11, further including sending the control signal to reduce driving speed of the vehicle, when the maximum lateral acceleration of the vehicle is equal to or greater than the second lateral acceleration threshold.

17. The method of claim 11,
wherein the first lateral acceleration threshold includes a highest value of lateral acceleration to be generated while the vehicle is driven, and
wherein the second lateral acceleration threshold includes a highest value of lateral acceleration to be generated by steering while the vehicle is driven.

18. The method of claim 16, further including controlling driving speed of the vehicle based on the control signal.

* * * * *